US011051238B2

(12) United States Patent
Tao

(10) Patent No.: US 11,051,238 B2
(45) Date of Patent: Jun. 29, 2021

(54) COMMUNICATION METHOD AND APPARATUS BASED ON RELAY DEVICE

(71) Applicant: ALIBABA GROUP HOLDING LIMITED, Grand Cayman (KY)

(72) Inventor: Zhen Tao, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 16/427,147

(22) Filed: May 30, 2019

(65) Prior Publication Data
US 2019/0373538 A1 Dec. 5, 2019

(51) Int. Cl.
*H04W 48/16* (2009.01)
*H04W 72/04* (2009.01)
*H04W 16/14* (2009.01)
*H04W 76/11* (2018.01)
*H04W 12/0431* (2021.01)

(52) U.S. Cl.
CPC ....... *H04W 48/16* (2013.01); *H04W 12/0431* (2021.01); *H04W 16/14* (2013.01); *H04W 72/0446* (2013.01); *H04W 76/11* (2018.02)

(58) Field of Classification Search
CPC ............. H04W 72/0446; H04W 16/14; H04W 7/15557; H04W 48/16; H04W 12/08; H04W 76/11; H04W 76/14; H04W 63/0428; H04W 12/0431; H04W 4/70; H04W 88/04; H04W 72/04; H04W 12/04
USPC .......................................... 370/329
See application file for complete search history.

(56) References Cited

U.S. PATENT DOCUMENTS

| 8,169,965 | B2* | 5/2012 | Rexhepi | H04W 36/0033 370/331 |
| 8,411,647 | B2* | 4/2013 | Lee | H04W 74/004 370/337 |
| 8,547,921 | B2* | 10/2013 | Youn | H04W 56/0085 370/329 |
| 8,649,348 | B2* | 2/2014 | Huang | H04B 7/15528 370/329 |
| 8,699,364 | B2* | 4/2014 | Ishii | H04W 74/008 370/252 |
| 8,874,028 | B2* | 10/2014 | Nakagawa | H04W 28/06 455/9 |

(Continued)

OTHER PUBLICATIONS

PCT International Search Report and Written Opinion dated Aug. 8, 2019, in corresponding PCT Application No. PCT/US2019/034695. (6 pages).

*Primary Examiner* — Man U Phan
(74) *Attorney, Agent, or Firm* — Finnegan, Henderson, Farabow, Garrett & Dunner, LLP

(57) ABSTRACT

The present application discloses communication methods and systems. The communication method includes: receiving a first uplink data frame from a terminal operating in a second mode, wherein the first uplink data frame comprises a first mode identifier and a terminal identifier, and the first mode identifier is used to indicate to a base station that the terminal is operating in a first mode; determining that the terminal operates in the second mode, according to a first information set and the terminal identifier; sending the first uplink data frame to the base station; receiving a first downlink data frame from the base station; and forwarding the first downlink data frame to the terminal.

9 Claims, 10 Drawing Sheets

300

(56) References Cited

U.S. PATENT DOCUMENTS

| | | | |
|---|---|---|---|
| 9,622,248 B2* | 4/2017 | Speight | H04W 4/70 |
| 9,680,557 B2* | 6/2017 | Kim | H04W 72/044 |
| 9,900,825 B2* | 2/2018 | Jeong | H04W 40/22 |
| 10,129,890 B2* | 11/2018 | Speight | H04W 4/70 |
| 10,200,933 B2* | 2/2019 | Jeong | H04W 52/0216 |
| 10,251,164 B2* | 4/2019 | Speight | H04B 7/155 |
| 10,277,234 B2* | 4/2019 | Sennoun | H04W 52/0254 |
| 10,470,146 B2* | 11/2019 | Lalam | H04W 56/0015 |
| 10,492,202 B2* | 11/2019 | Speight | H04W 4/70 |
| 10,652,870 B2* | 5/2020 | Speight | H04B 7/155 |
| 10,771,555 B2* | 9/2020 | Tomimoto | G06Q 30/06 |
| 2010/0240400 A1 | 9/2010 | Choi | |
| 2011/0212685 A1 | 9/2011 | Nakagawa | |
| 2011/0261777 A1 | 10/2011 | Maeda et al. | |
| 2012/0093070 A1 | 4/2012 | Huang et al. | |
| 2016/0099767 A1 | 4/2016 | Kim et al. | |
| 2017/0019937 A1 | 1/2017 | Kim et al. | |
| 2018/0132292 A1 | 5/2018 | Yang et al. | |
| 2020/0028540 A1* | 1/2020 | Teboulle | H04W 52/0216 |

* cited by examiner

| Bit# | 7 | 6 | 5 | 4 | [3..0] |
|---|---|---|---|---|---|
| FCtrl bits | ADR | ADRACKReq | ACK | Class B | FOptsLen |

COMMUNICATION METHOD AND APPARATUS BASED ON RELAY DEVICE

CROSS REFERENCE TO RELATED APPLICATION

The disclosure claims the benefits of priority to Chinese application number 201810551271.4, filed May 31, 2018, which is incorporated herein by reference in its entirety.

BACKGROUND

The Internet-of-things technology is the third information technology revolution after the computer technology and the Internet. The Internet-of-things technology has features and advantages of real-time performance and interactivity, and has been widely used in fields such as urban management, digital homes, positioning and navigation, logistics management, and security systems. Long Range Radio (LoRa) is an ultra-long-distance transmission technology based on the spread-spectrum technology in the Internet-of-things. LoRa has features of long transmission distances, low power consumption, multiple nodes, and low cost.

In conventional data transmission methods, a LoRa network system generally includes a terminal, a base station, and a server. The LoRa terminal has several working modes, one of which is a Class B mode. In general, an uplink signal of the terminal in Class B mode is directly received by a base station, and a downlink signal of the base station may also be directly received by the terminal in Class B mode. However, in some cases, signals from the base station and the terminal cannot arrive at their counterparts due to attenuation. For example, if a Class B mode terminal is installed underground, the signal strength may be attenuated, making communication between the base station and the Class B mode terminal impossible. Another reason why the base station or the Class B mode terminal may not receive the data of its counterpart is that the deployment distance is too far to receive the data.

SUMMARY OF THE DISCLOSURE

In view of the foregoing problems, embodiments of the disclosure are proposed to provide a relay device-based communication method, a communication method between a terminal and a base station, a relay device-based communication apparatus, and a communication apparatus between a terminal and a base station that address or at least partially solve the foregoing problems.

Embodiments of the disclosure provide a communication method of a relay device. The method can include: receiving a first uplink data frame from a terminal operating in a second mode, wherein the first uplink data frame comprises a first mode identifier and a terminal identifier, and the first mode identifier is used to indicate to a base station that the terminal is operating in a first mode; determining that the terminal operates in the second mode, according to a first information set and the terminal identifier; sending the first uplink data frame to the base station; receiving a first downlink data frame from the base station; and forwarding the first downlink data frame to the terminal.

Embodiments of the disclosure also provide a communication method of a terminal operating in a second mode. The communication method can include: determining a first period information set from at least one preset period information set; acquiring first period information according to the first period information set; sending, in a relay device mode, a first uplink data frame to a relay device, wherein the first uplink data frame comprises the first period information, a first mode identifier, and a terminal identifier, the first period information allows the relay device to receive, according to the first period information, a first downlink data frame from the base station, and the terminal identifier allows the relay device to determine that the terminal operates in the second mode according to a first information set and the terminal identifier; and receiving the first downlink data frame from the relay device.

Embodiments of the disclosure further provide a communication method based on a relay device. The method can include: receiving a first uplink data frame from a terminal, wherein the first uplink data frame comprises a terminal identifier, and the terminal operates in a second mode; determining that the terminal operates in the second mode according to a first information set and the terminal identifier; sending a second uplink data frame to a base station, wherein the second uplink data frame comprises a first mode identifier used to indicate to the base station that the terminal operates in a first mode; receiving a first downlink data frame from the base station; and sending the first downlink data frame to the terminal.

Embodiments of the disclosure further provide a communication method of a relay device. The method can include: receiving a first uplink data frame from a terminal operating in a second mode, wherein the first uplink data frame comprises a second mode identifier; sending a second uplink data frame to a base station, wherein the second uplink data frame comprises a first mode identifier used to indicate to the base station that the terminal operates in a first mode; receiving a first downlink data frame from the base station; and sending the first downlink data frame to the terminal.

Embodiments of the disclosure further provide a communication system. The system can include: a memory storing a set of instructions; and at least one processor configured to execute the set of instructions to cause the system to perform: receiving a first uplink data frame from a terminal operating in a second mode, wherein the first uplink data frame comprises a first mode identifier and a terminal identifier, and the first mode identifier is used to indicate to a base station that the terminal is operating in a first mode; determining that the terminal operates in the second mode, according to a first information set and the terminal identifier; sending the first uplink data frame to the base station; receiving a first downlink data frame from the base station; and forwarding the first downlink data frame to the terminal.

Embodiments of the disclosure further provide a terminal operating in a second mode. The terminal can include: a memory storing a set of instructions; and at least one processor configured to execute the set of instructions to cause the terminal to perform: determining a first period information set from at least one preset period information set; acquiring first period information according to the first period information set; sending, in a relay device mode, a first uplink data frame to a relay device, wherein the first uplink data frame comprises the first period information, a first mode identifier, and a terminal identifier, the first period information allows the relay device to receive, according to the first period information, a first downlink data frame from the base station, and the terminal identifier allows the relay device to determine the terminal operates in the second mode according to a first information set and the terminal identifier; and receiving the first downlink data frame from the relay device.

Embodiments of the disclosure further provide a communication system. The system can include: a memory storing a set of instructions; and at least one processor configured to execute the set of instructions to cause the system to perform: receiving a first uplink data frame from a terminal, wherein the first uplink data frame comprises a terminal identifier, and the terminal operates in a second mode; determining that the terminal operates in the second mode according to a first information set and the terminal identifier; sending a second uplink data frame to a base station, wherein the second uplink data frame comprises a first mode identifier used to indicate to the base station that the terminal operates in a first mode; receiving a first downlink data frame from the base station; and sending the first downlink data frame to the terminal.

Embodiments of the disclosure further provide a communication system. The system can include: a memory storing a set of instructions; and at least one processor configured to execute the set of instructions to cause the system to perform: receiving a first uplink data frame from a terminal, wherein the first uplink data frame comprises a second mode identifier, and the terminal operates in a second mode; sending a second uplink data frame to a base station, wherein the second uplink data frame comprises a first mode identifier used to indicate to the base station that the terminal operates in a first mode; receiving a first downlink data frame from the base station; and sending the first downlink data frame to the terminal.

In the embodiments of this application, a relay device may receive a first downlink data frame sent by a base station, and the relay device may send a second downlink data frame to a terminal according to the first downlink data frame. The second downlink data frame may include a first preamble that is a long preamble. The relay device may wake up the terminal by setting the long preamble in the second downlink data frame. As such, it is ensured that the terminal can be woken up through the long preamble and receive a downlink data frame from the base station in a ping slot when power saving of the terminal is guaranteed.

BRIEF DESCRIPTION OF THE DRAWINGS

FIG. 2 illustrates a schematic diagram of frame control bits, according to embodiments of the disclosure.

DETAILED DESCRIPTION

Figure 1:
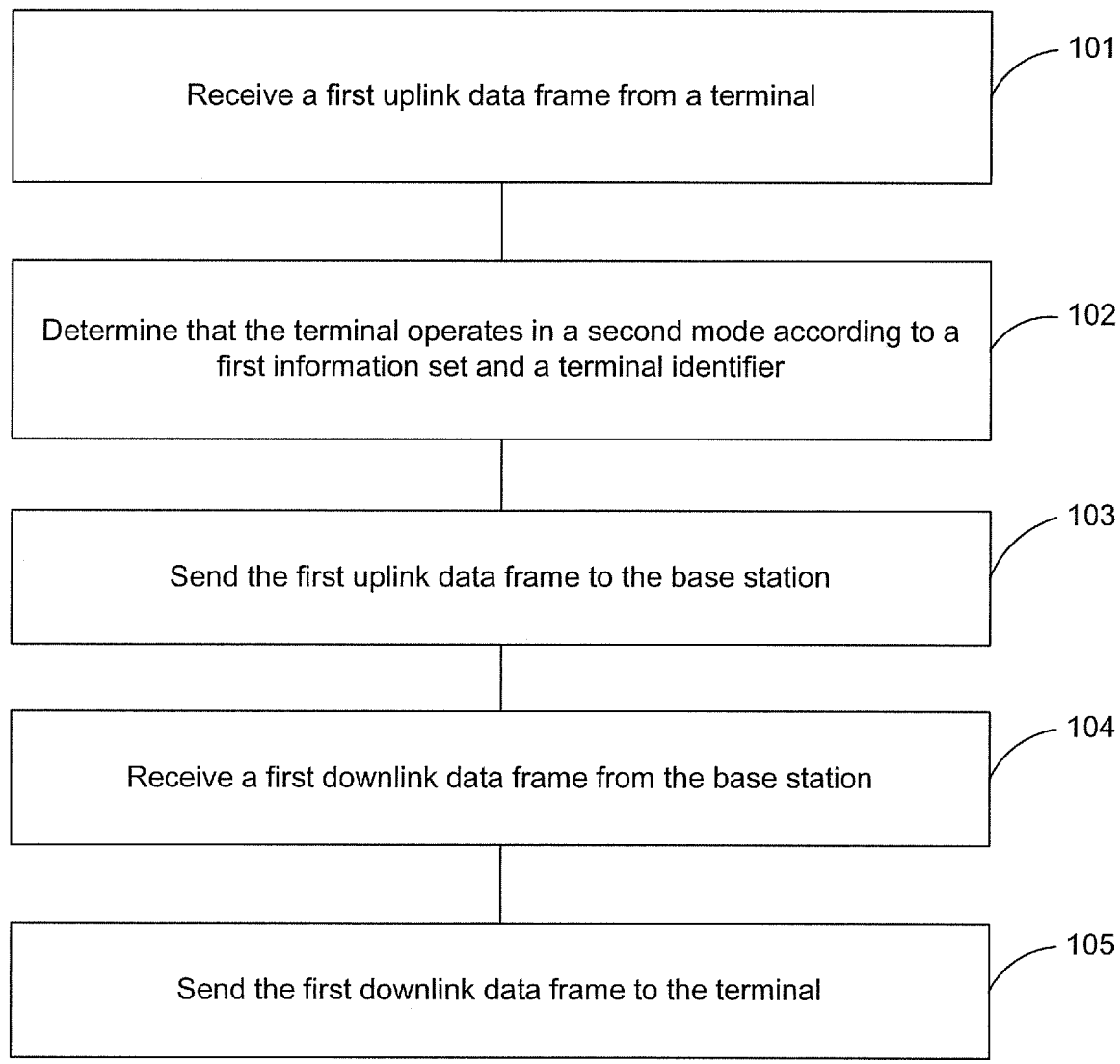
FIG. 1 is a flowchart of an exemplary communication method based on a relay device, according to embodiments of the disclosure.

To enable the foregoing objectives, features, and advantages of this application to be more comprehensible, this application is described in the following in further detail with reference to the accompanying drawings and specific implementation manners.

A LoRa network includes a terminal node, a base station node, and a server. The terminal may be connected to a LoRa network. Depending on the application scenarios where the LoRa network is deployed, the terminal may include a variety of electronic devices. For example, the terminal may include an electricity meter when the LoRa network is used for urban management. As another example, the terminal may include a variety of intelligent household appliances when the LoRa network is used for a digital home.

LoRa terminals may have several working modes, such as a Class A mode, a Class B mode, and a Class C mode.

A terminal in Class A mode may report data on demand, according to an ALOHA protocol. The ALOHA protocol is a networking protocol that can establish a wireless data network. According to the ALOHA protocol, each uplink is followed by two transitory downlink reception slots to achieve a two-way transmission. This operation can be power-saving.

A Class B mode terminal allows more reception slots. The Class B mode terminal may open a reception slot within a foreseeable period of time, other than the reception slots provided after a random uplink of the terminal in Class A mode. The slot can be referred to as a ping slot. A downlink data frame sent by the server in the reception slot can be referred to as a ping frame. In order to enable the terminal to open the reception slot at a given time, the terminal may receive a time-synchronized beacon frame from the base station. Thus, the server can know moments of all the reception slots of the terminal device.

A terminal in Class C mode generally opens the reception slot all the time and only closes it temporarily at the time of sending. Therefore, the terminal consumes more power operating in Class C mode than operating in Class A mode or Class B mode.

The base station, also referred to as a gateway or concentrator in the LoRa network, has a wireless connection aggregation function. The wireless connection aggregation function can provide the terminal with a port for connecting to the LoRa network, forwarding data from the server or terminal, and implementing data interaction between the terminal and the server. The base station can also carry out data interaction with other base stations in the signal coverage of the base station by transmitting wireless frames.

The server may include a server or a cluster of servers, configured to process services based on data acquired from the base station or the terminal and control the working mode and the working status of the base station or the terminal.

In some embodiments of the present disclosure, a relay device in Class B mode can be deployed between the terminal and the base station, and communications can be established between the terminal and the base station through a LoRa relay device in Class B mode. The relay device may also choose, in accordance with the LoRa protocol, one of Class A mode, Class B mode, and Class C mode. In embodiments of this disclosure, the relay device can save more power when it is in Class B mode than in Class C mode.

A communication process after the terminal is connected to the network will be introduced from the perspective of the relay device, as below.

FIG. 1 is a flowchart of an exemplary communication method 100 based on a relay device, according to embodiments of the disclosure. Method 100 may include steps as below.

In step 101, a relay device receives a first uplink data frame sent by a terminal. The first uplink data frame includes a first mode identifier and a terminal identifier. The first mode identifier can be associated with a first mode. The terminal can operate in a second mode. However, the first mode identifier can make a base station believe that the terminal is operating in the first mode.

In embodiments of the disclosure, the relay device operates in a first mode (e.g., Class B mode), and the terminal operates in a second mode (e.g., Class C mode).

The first mode identifier, therefore, can be referred to as a Class B mode identifier. Although the terminal operates in the second mode (e.g., Class C mode), the terminal can act as if it were operating in the first mode (e.g., Class B mode). For example, the terminal can add the first mode identifier to the first uplink data frame, thus making the base station believe that the terminal is operating in the first mode. The terminal identifier may be a Device Extended Unique Identifier (DevEUI).

In step 102, the relay device determines a mode of the terminal as the second mode, according to a first information set and the terminal identifier. The first information set includes terminal identifiers of a plurality of terminals. The relay device extracts the terminal identifier from the first uplink data frame, then searches the first information set to determine whether a terminal identifier matches with the extracted terminal identifier. If the first information set includes the terminal identifier matched with the extracted terminal identifier, the relay device records a mode of the terminal operates as the second mode.

In embodiments of the disclosure, the relay device can acquire the first information set in an out-of-band manner. The out-of-band manner may be a factory setting manner of the relay device. The first information set may be preset in the relay device before leaving the factory.

In step 103, the relay device sends the first uplink data frame to the base station.

For example, the first uplink data frame sent by the relay device to the base station may include a second preamble. The first uplink data frame sent by the terminal to the relay device may include a first preamble. The relay device may replace the first preamble in the received first uplink data frame with the second preamble, and then the relay device sends the first uplink data frame including the second preamble to the base station.

In step 104, the relay device receives a first downlink data frame sent by the base station. In embodiments of the disclosure, because the first uplink data frame sent by the relay device to the base station includes a first mode identifier, the base station sends a downlink data frame to the terminal according to a first mode. In the first mode, the base station can send a first downlink data frame in an appointed time window (also known as a Ping-Slot), and send the first downlink data frame in a time window after the terminal sends the first uplink data frame. The relay device can receive data in its own time window (pulse slot Ping-Slot) and the time window (pulse slot Ping-Slot) of the terminal.

The first mode identifier (e.g., Class B mode identifier) can be, for example, a one-bit identifier in frame control bits (FCtrl) of a frame header (FHDR).

FIG. 2 illustrates a schematic diagram of frame control bits, according to embodiments of the disclosure. If the value of the Class B mode identifier is set to 1, it indicates that the terminal is in the first mode. The relay device makes the server believe that the terminal is operating in the first mode by setting the value of the corresponding Class B mode identifier to 1. And thus, the server may send downlink data frames to the relay device in one or more receiving windows. In some embodiments, the base station may also send uplink and downlink data frames out of the appointed time window (e.g., a Ping-Slot).

In embodiments of the disclosure, the first uplink data frame may further include first period information. And step 104 may further include: receiving, by the relay device in the first mode according to the first period information, the first downlink data frame sent by the base station.

The first period information indicates a period during which the base station opens a time window at an appointed time. The first time period may also be a pulse slot period (Ping-Slot Periodicity). The base station may open a time window according to the period indicated by the first period information and send a first downlink data frame to the relay device in the time window. For example, the first period information is provided in a first field of the first uplink data frame. The first field can be a Fopts field in a frame header format. In some embodiments, the base station may also send the first downlink data frame without following the first period information.

Referring back to FIG. 1, in step 105, the relay device sends the first downlink data frame to the terminal. In embodiments of the disclosure, step 105 may include: sending, by the relay device in the second mode, the first downlink data frame to the terminal.

In embodiments of the disclosure, the terminal operating in the second mode may communicate with the base station through the relay device operating in the first mode. The first uplink data frame sent by the relay device to the base station includes a first mode identifier, and thus the base station can send a first downlink data frame in an appointed time window, which reduces the unpredictability of sending the first downlink data frame. As a result, the relay device may not open a receiving window for a long time to prepare for receiving downlink frames of Class C, and the relay device can receive uplink data frames of the terminal more effectively, thus improving the efficiency of sending and receiving.

Figure 3:
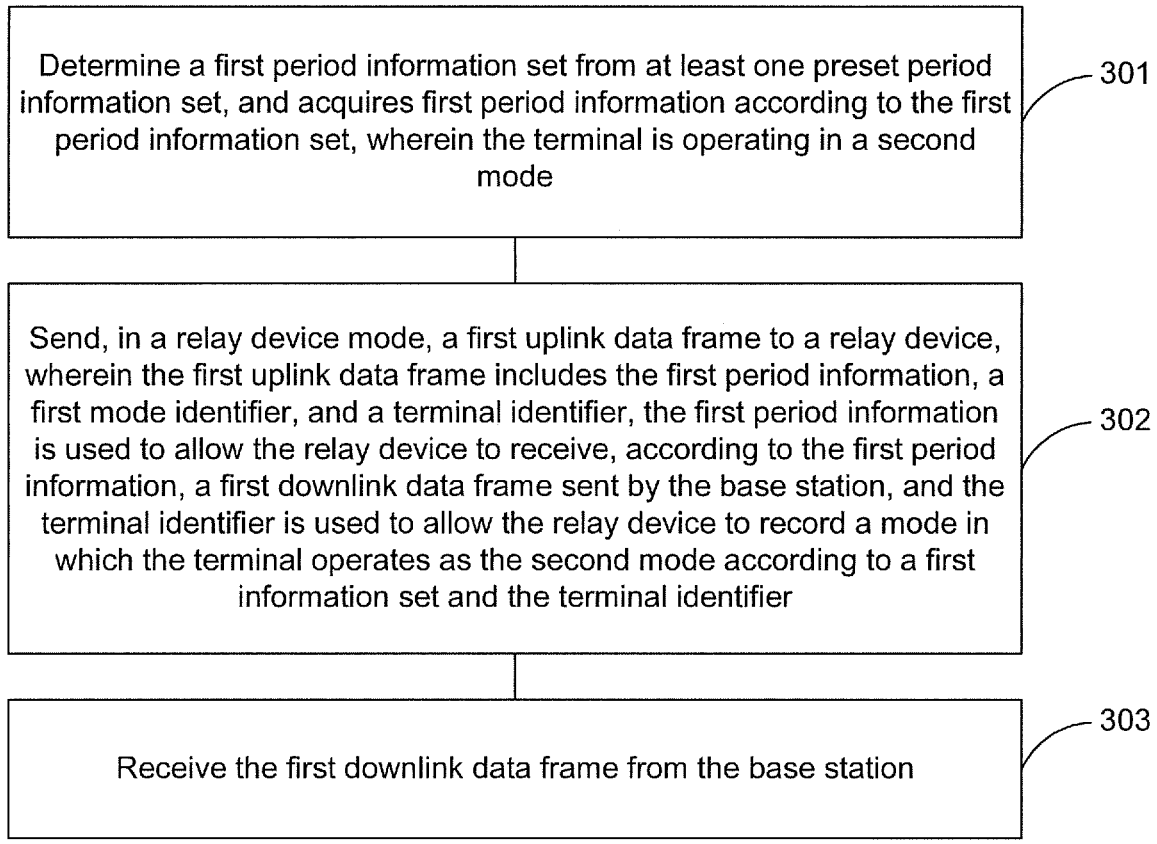
FIG. 3 is a flowchart of an exemplary method for communications between a terminal and a base station, according to embodiments of the disclosure.

FIG. 3 is a flowchart of an exemplary method 300 for communications between a terminal and a base station, according to embodiments of the disclosure. Method 300 may include the following steps.

In step 301, the terminal determines a first period information set from at least one preset period information set and acquires first period information according to the first period information set, wherein the terminal is operating in a second mode. In some embodiments, the period information set may be a set of parameters used by the terminal operating in a Class C relay device mode for disguising itself as in the Class B mode. The set of parameters may include a number of pulse slots (also referred to as PingNb) included in each beacon frame period and other parameters. After switching from a normal mode to the relay device mode, the Class C terminal will select one group from at least one group of period information sets and calculate the first period information according to the selected period information set. The first period information may be a pulse slot period (Ping-Slot Periodicity).

In step 302, the terminal sends, in the relay device mode, a first uplink data frame to a relay device. The first uplink data frame includes the first period information, a first mode identifier, and a terminal identifier. The first period information can allow the relay device to receive, according to the first period information, a first downlink data frame sent by the base station, and the terminal identifier can allow the relay device to record a mode in which the terminal operates as the second mode according to a first information set and the terminal identifier.

In some embodiments, the relay device may also receive the first downlink data frame sent by the base station, without following the first period information.

In step 303, the terminal receives a first downlink data frame sent by the relay device.

In embodiments of the disclosure, step 303 may further include receiving, by the terminal in the second mode, the first downlink data frame sent by the relay device.

In some embodiments, the second mode is a Class C mode, and the relay device may determine, according to the first information set and the DevEUI of the terminal, that the terminal operates in the second mode. The relay device may send a first downlink data frame to the terminal. The first downlink data frame includes a common preamble, rather than a long preamble. The relay device may send this first downlink data frame to the terminal at any moment. It is appreciated that the relay device may also send this downlink data frame to the terminal in a specified time window.

In embodiments of the disclosure, the method may further include: switching the terminal from a normal mode to the relay device mode. In the normal mode, a network access request frame sent by the terminal includes a preamble with a common length. In the relay device mode, the network access request frame sent by the terminal includes a long preamble. The long preamble functions to activate the relay device, so that the relay device can send the network access request frame sent by the terminal to the base station side.

In embodiments of the disclosure, the terminal operating in the second mode may communicate with the base station through the relay device operating in the first mode. The first uplink data frame sent by the terminal to the relay device includes a first mode identifier, the relay device sends the first uplink data frame to the base station. Thus, the base station can send a first downlink data frame in an appointed time window, thereby reducing the unpredictability of sending the first downlink data frame. As a result, the relay device does not need to open a receiving window for a long time to prepare for receiving downlink frames of Class C, and the relay device can receive uplink data frames of the terminal more effectively, thus improving the efficiency of sending and receiving.

Figure 4:
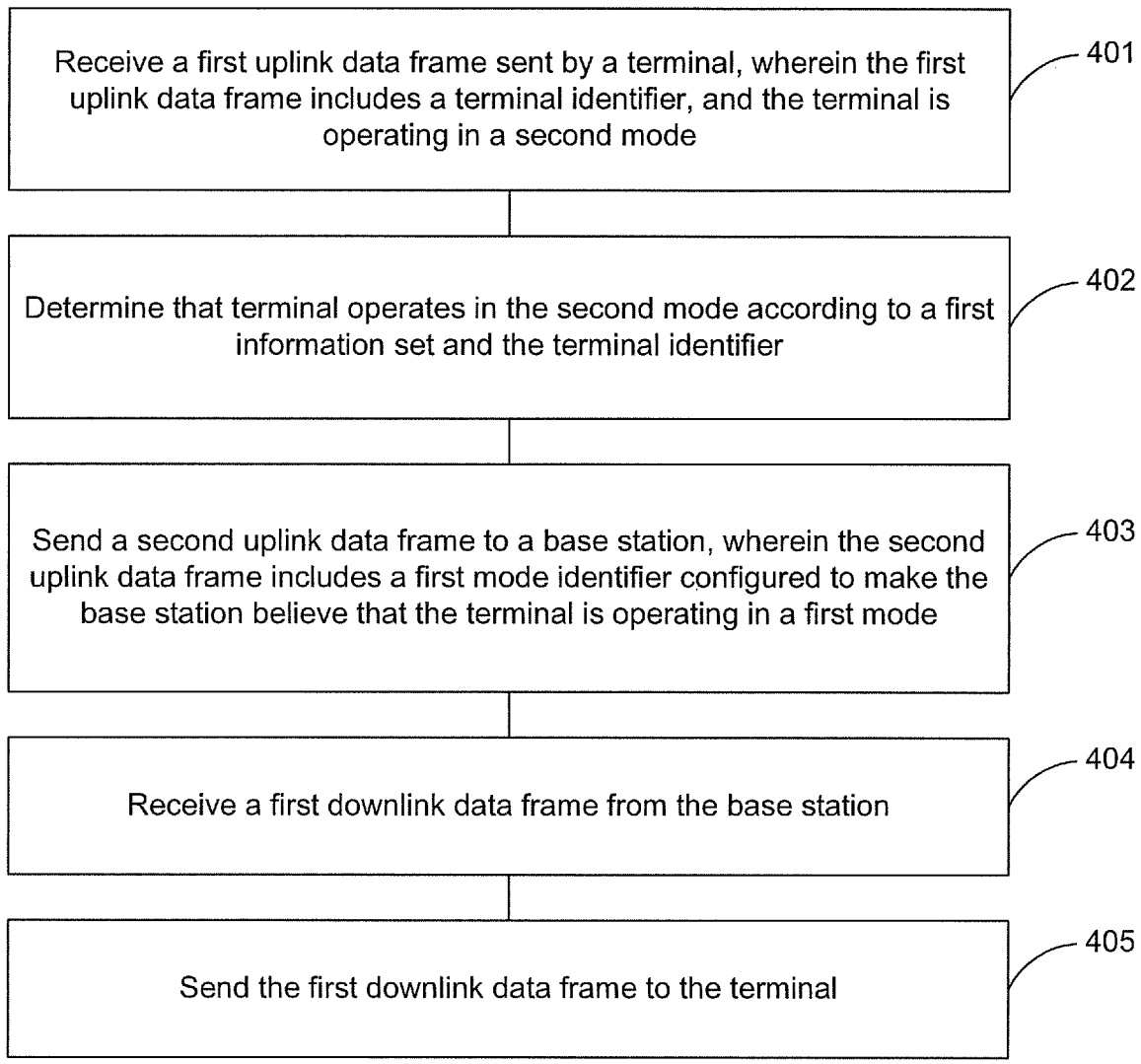
FIG. 4 is a flowchart of an exemplary relay device-based communication method, according to embodiments of this disclosure.

FIG. 4 is a flowchart of an exemplary relay device-based communication method 400 according to embodiments of this disclosure. Method 400 may include the following steps.

In step 401, a relay device receives a first uplink data frame sent by a terminal. The first uplink data frame includes a terminal identifier, and the terminal operates in a second mode.

In embodiment of this disclosure, the first uplink data frame may further include a first mode identifier. For example, the Class C terminal can be switched from a normal mode to a relay device mode. The terminal may disguise itself as operating in the first mode. The disguising method can add the first mode identifier to the first uplink data frame, thus making the base station believe that the terminal is operating in the first mode.

In another example, the first uplink data frame may not include the first mode identifier.

In embodiments of the disclosure, the method may further include: determining, by the relay device, a first period information set from at least one preset period information set; and acquiring, by the relay device, the first period information according to the first period information set. For example, the terminal may also only send an uplink data frame without the first mode identifier. The relay device may determine, by acquiring the DevEUI in the uplink data frame of the terminal, whether the identifier exists in the first information set. The first information set may be a white list including all Class C DevEUIs. If the identifier exists in the first information set, the relay device can determine that the terminal is a Class C terminal and calculate the first period information by using one group of its preset period information set. The first period information may be a pulse slot period (Ping-Slot Periodicity). The period information set may be a set of parameters preset in the relay device and used for disguising the Class C terminal as a Class B terminal. The set of parameters is mainly used to calculate Class B parameters such as a pulse slot period.

In step 402, the relay device records a mode in which the terminal operates as the second mode according to a first information set and the terminal identifier. For example, the relay device may determine, by acquiring the DevEUI in the uplink data frame of the terminal, whether the identifier exists in the first information set. The first information set may be a white list including all Class C DevEUIs. If the identifier exists in the first information set, the relay device can determine that the terminal is a Class C terminal.

In embodiments of the disclosure, the method may further include: acquiring, by the relay device, the first information set in the out-of-band manner. The out-of-band manner may be a factory setting manner of the relay device. The first information set may be preset in the relay device before leaving the factory.

In step 403, the relay device sends a second uplink data frame to a base station. The second uplink data frame includes a first mode identifier for making the base station believe that the terminal is operating in a first mode.

In embodiments of the disclosure, the relay device may send a second uplink data frame according to the first uplink data frame. For example, after the relay device determines that the terminal is operating in the second mode and acquires the first uplink data frame, the value of a Class B identifier in a frame control byte (FCtrl) of a frame header (FHDR) can be set to 1, and a second uplink data frame can be generated.

In some embodiments, a second-mode terminal may indicate that the terminal is operating in the second mode. Similarly, a first-mode terminal may indicate that the terminal is operating in the first mode.

The second uplink data frame may further include a check code. The method may further include: acquiring, by the relay device, a network key of the terminal in an out-of-band manner; and generating, by the relay device, the check code according to the network key. The out-of-band manner may include determining a network key of the terminal by the relay device before leaving the factory. The network key may be further used to decrypt uplink data frames of the terminal and downlink data frames of the base station. The network key may also be used to encrypt uplink data frames of the terminal and downlink data frames of the base station that are modified by the relay device. For example, the network key may be an application key.

The relay device may add the check code to the second uplink data frame, so that the base station can detect the integrity of an uploaded data frame through the check code.

In step 404, the relay device receives a first downlink data frame sent by the base station.

In embodiments of the disclosure, the second uplink data frame may further include first period information. The first period information is provided in a first field of the second uplink data frame. Step 404 may further include: receiving, by the relay device in the first mode according to the first period information, the first downlink data frame sent by the base station. For example, the first field can be a Fopts field in a frame header format. The first period information is a pulse slot period (also known as a Ping-Slot Periodicity). The base station can receive the second uplink data frame, parse a pulse slot period carried by the second uplink data frame, and periodically send a first downlink data frame to the relay device in a period indicated by the pulse slot period. The time window for sending a downlink data frame may be a pulse slot. The base station may also send the first downlink data frame without following the first period information.

In step 405, the relay device sends the first downlink data frame to the terminal.

In embodiments of the disclosure, step 405 may further include: sending, by the relay device in the second mode, the first downlink data frame to the terminal.

For example, the second mode can be a Class C mode. The relay device may determine, according to the first information set and the DevEUI of the terminal, that the terminal operates in the second mode. The relay device may send a first downlink data frame to the terminal. The first downlink data frame may include a common preamble, rather than a long preamble. The relay device may send this first downlink data frame at any moment. It is appreciated that the relay device may also send this downlink data frame to the terminal in an predetermined time window. In embodiments of the disclosure, the terminal operating in the second mode may communicate with the base station through the relay device operating in the first mode. The second uplink data frame sent by the relay device to the base station includes a first mode identifier. Thus, the base station may send a first downlink data frame in an appointed time window, thereby reducing the unpredictability of sending the first downlink data frame. As a result, the relay device does not need to open a receiving window for a long time to prepare for receiving downlink frames of Class C, and the relay device can receive uplink data frames of the terminal more effectively, thus improving the efficiency of sending and receiving.

Figure 5:
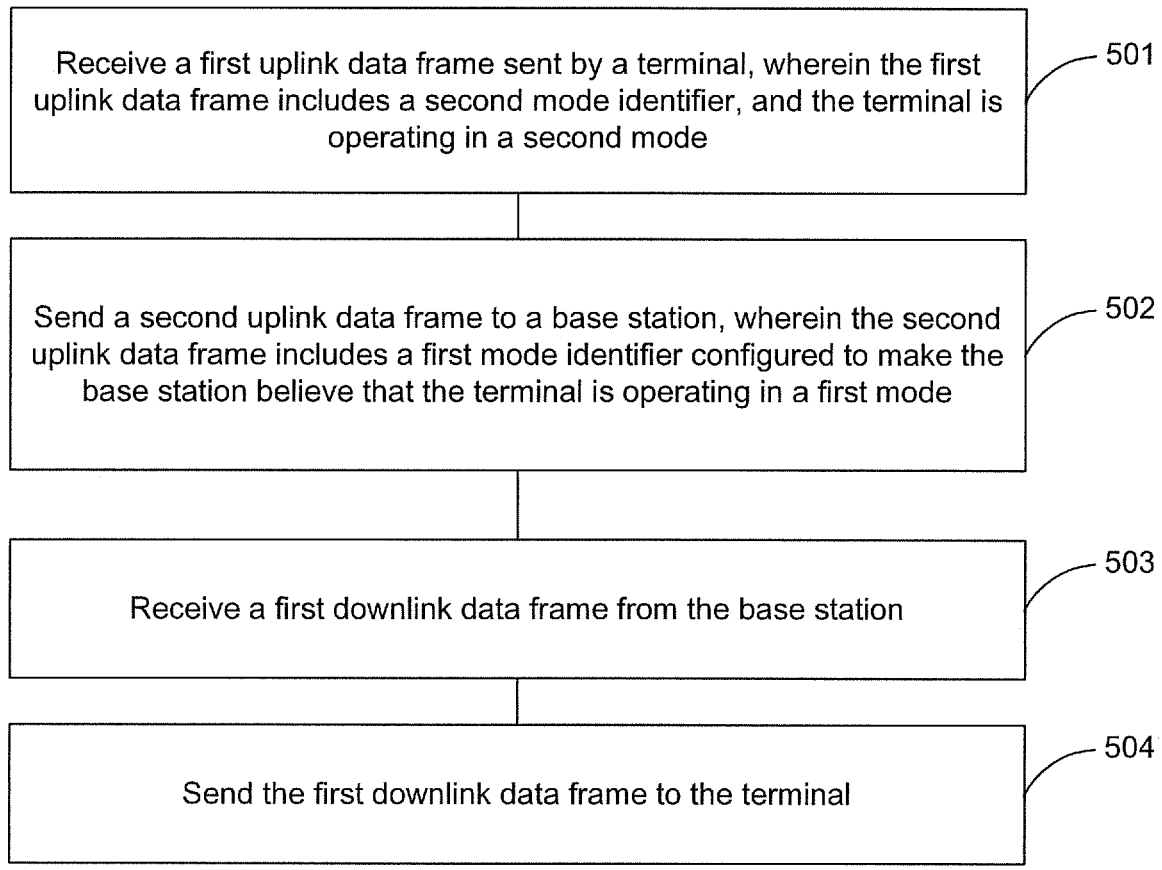
FIG. 5 is a flowchart of another exemplary relay device-based communication method, according to embodiments of the disclosure.

FIG. 5 is a flowchart of an exemplary relay device-based communication method 500 according to embodiments of the disclosure. Method 500 may include the following steps.

In step 501, a relay device receives a first uplink data frame sent by a terminal. The first uplink data frame includes a second mode identifier, and the terminal operates in a second mode. For example, the second mode identifier (e.g., a Class C mode identifier) may indicate a DeviceModeInd command. The first uplink data frame may carry the DeviceModeInd command. The command can indicate whether the terminal operates in a Class C mode or in a Class A mode. When the value of the command is 0x00, it indicates the Class A mode. When the value of the command is 0x02, it indicates the Class C mode. Optionally, the DeviceModeInd command may be provided in a first field of the first uplink data frame. The first field can be a Fopts field in a frame header format.

In step 502, the relay device sends a second uplink data frame to a base station. The second uplink data frame includes a first mode identifier for making the base station believe that the terminal operates in a first mode. For example, the relay device may send a second uplink data frame to the base station according to the first uplink data frame; and by acquiring the DeviceModeInd in the Fopts field in the first uplink data frame, the relay device may believe that the terminal operates in the Class C mode. The relay device may disguise the Class C terminal as a Class B terminal. The disguising method includes setting a Class B identifier in the first uplink data frame to 1 and generating a second uplink data frame accordingly. The second uplink data frame carries a first mode identifier. The first mode identifier is used to make the base station believe that the terminal is operating in the first mode.

In embodiments of the disclosure, the second uplink data frame includes a check code, and the method may further include: acquiring, by the relay device, a network key of the terminal in an out-of-band manner; and generating, by the relay device, the check code according to the network key. The out-of-band manner may be a network key of the terminal set by the relay device before leaving the factory. The network key may also be used to decrypt uplink data frames of the terminal and downlink data frames of the base station. The network key may also be used to encrypt uplink data frames of the terminal and downlink data frames of the base station that are modified by the relay device. Optionally, the network key may also be an application key.

The relay device may add the check code to the second uplink data frame, so that the base station can detect the integrity of an uploaded data frame through the check code.

In step 503, the relay device receives a first downlink data frame sent by the base station.

In embodiments of the disclosure, the second uplink data frame may further include first period information. The first period information is provided in a first field of the second uplink data frame. The first field can be a Fopts field.

For example, after determining that the terminal operates in a Class C mode, the relay device can calculate the first period information based on one group of its preset period information set. The first period information may be a pulse slot period (e.g., a Ping-Slot Periodicity). The period information set may include a set of parameters preset in the relay device and used for disguising the Class C terminal as a Class B terminal. The set of parameters can be used to calculate Class B parameters, such as a pulse slot period. Information in the period information set may include PingNb and other information.

Step 503 may further include: receiving, by the relay device in the first mode according to the first period information, the first downlink data frame sent by the base station. For example, the first period information can indicate a period during which the relay device is woken up and opens a time window at a given time. The first time period may also be a pulse slot period (e.g., Ping-Slot Periodicity). The relay device may be woken up according to the period indicated by the first period information and receive the first downlink data frame sent by the base station in a specified time window. The first period information can be provided in a first field of the first uplink data frame. The first field can be a Fopts field in a frame header format. The relay device may also receive the first downlink data frame without following the first period information.

In step 504, the relay device sends the first downlink data frame to the terminal.

In embodiments of the disclosure, step 504 may include: sending, by the relay device in the second mode, the first downlink data frame to the terminal.

In some embodiments, the second mode is a Class C mode, and the relay device may determine, according to the Class C identifier in the DeviceModeInd command carried in the first uplink data frame, that the terminal operates in the second mode. The relay device may send a first downlink data frame to the terminal. The first downlink data frame includes a common preamble rather than a long preamble. The relay device may send this first downlink data frame to the terminal at any moment. The relay device may also send this downlink data frame to the terminal in a specified time window.

In embodiments of the disclosure, the terminal operating in the second mode may communicate with the base station through the relay device operating in the first mode. The second uplink data frame sent by the relay device to the base station includes a first mode identifier. Thus, the base station can send a first downlink data frame in a given time window, thereby reducing the unpredictability of sending the first downlink data frame. As a result, the relay device does not need to open a receiving window for a long time to prepare for receiving downlink frames of Class C, and the relay device can receive uplink data frames of the terminal more effectively, thus improving the efficiency of sending and receiving.

A process of connecting a terminal to a network through a relay device can be further introduced below from the perspective of the relay device.

Figure 6:
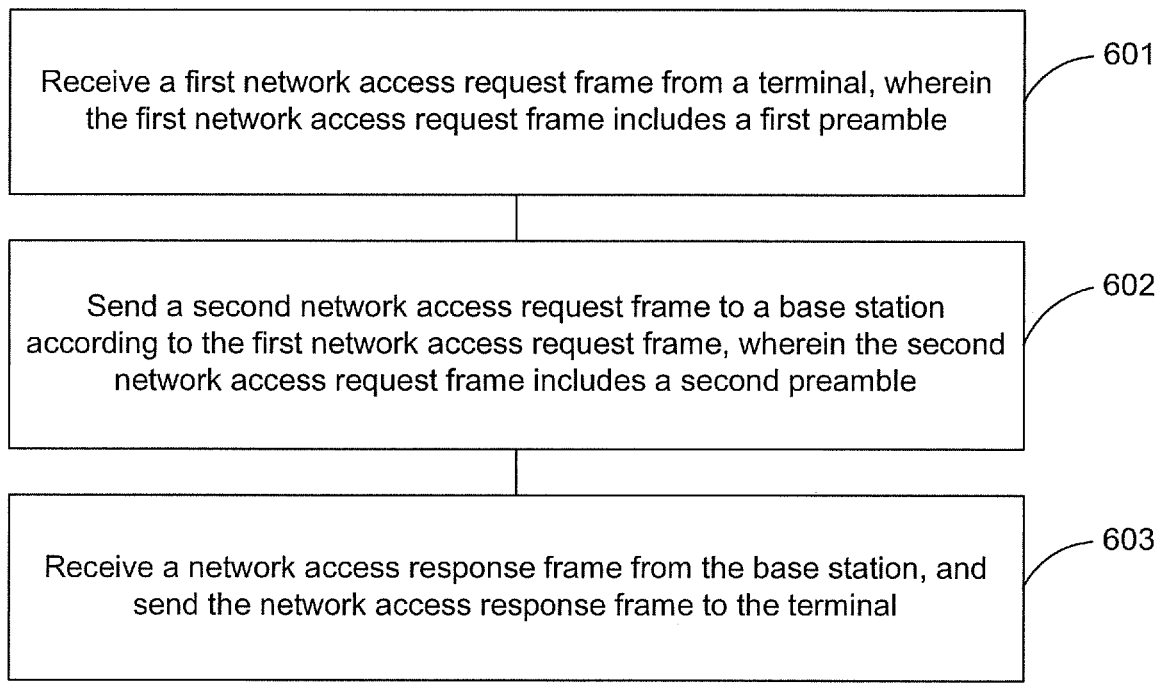
FIG. 6 is a flowchart of another exemplary relay device-based communication method, according to embodiments of the disclosure.

FIG. 6 is a flowchart of an exemplary relay device-based communication method 600, according to embodiments of the disclosure. Method 600 can include steps as below.

In step 601, a relay device receives a first network access request frame sent by a terminal. The first network access request frame includes a first preamble. In embodiments of the disclosure, the relay device can operate in a first mode, and the terminal can operate in a second mode. The first mode may be a Class B mode, and the second mode may be a Class C mode.

In a standard network access process, the terminal in a normal mode can send a second network access request frame to a base station. The second network access request frame includes a second preamble. If the terminal can receive a network access response frame (Join-Accept) returned by the base station, the standard network access is successful. However, when the second network access request frame sent by the terminal cannot be received by the base station or the network access response frame returned by the base station cannot arrive at the terminal, the standard network access is failed.

In embodiments of the disclosure, the relay device is disposed between the terminal and the base station. Communication between the terminal and the base station is established through the relay device. The relay device may be a LoRa relay device. For example, the terminal is buried underground to be 500 meters from the base station. If the terminal is incapable of receiving a signal from the base station as blocked by the ground, the relay device can be placed above the ground where the terminal is buried to relay signals.

In embodiments of the disclosure, the relay device, as a standard node, can be first connected to the network according to a standard network access process. Therefore, the relay device can first send a second network access request frame (including a second preamble) to the base station, and then receive a network access response frame returned by the base station. After the standard network access is successful, the relay device is in an intermittent dormancy state to reduce the power consumption.

When the standard network access process of the terminal is failed, the terminal may be switched from a normal mode to the relay device, and the terminal may send a first network access request frame (including a first preamble) to the relay device that has been connected to the network.

In the normal mode, a network access request frame sent by the terminal includes a preamble with a common length. In the relay device mode, the network access request frame sent by the terminal includes a long preamble. The long preamble functions to activate the relay device, so that the relay device can send the network access request frame sent by the terminal to the base station side.

A preamble can be a section of regular wireless signal for notifying a wireless receiver that a subsequent wireless signal includes valid information.

In embodiments of the disclosure, the first preamble is a section of wireless signal prior to the first network access request frame, and the second preamble is a section of wireless signal prior to the second network access request frame. For example, the second preamble can be a standard preamble, and can be a preamble in a standard format specified according to a LoRaWAN protocol. The first preamble is a long preamble, and the length of the first preamble is greater than that of the second preamble. The length of the preamble may include a time length. The number of symbols included in the standard preamble is fixed, and the total time length is shorter. The long preamble has a greater length, and thus the number of LoRa symbols included in each first preamble is more than that included in the second preamble. The first preamble must include enough LoRa symbols to ensure that the first preamble has a sufficient time length.

The first preamble is further aimed at activating the dormant wireless receiver, so its length is greater than that of the second preamble. For example, if a dormant period of the receiver is 4 s, the length of the first preamble is at least 4 s. The wireless receiver may be a relay device.

In embodiments of the disclosure, a first-mode relay device may have a Channel Activity Detection (CAD) mode. The CAD mode is designed to detect LoRa preambles on wireless channels with the highest possible power consumption efficiency. In the CAD mode, the relay device scans frequency bands quickly to detect preambles of LoRa wireless frames.

In embodiments of the disclosure, the step 601 may further include: waking the relay device up periodically from a dormancy state according to a third period, and detecting whether there is a first preamble at the time of wakeup; and if the first preamble is detected, the relay device receiving a first network access request frame.

In embodiments of the disclosure, length information of the third wakeup period is not greater than that of the first preamble, so that the first preamble will not be missed when the relay device is woken up. For example, the third wakeup period of the relay device is 4 seconds (4 s). In other words, the relay device is woken up every 4 s, and the length of the first preamble is greater than or equal to 4 s.

In step 602, the relay device sends a second network access request frame to the base station according to the first network access request frame, wherein the second network access request frame includes a second preamble. For example, the relay device may replace the first preamble in the first network access request frame with a second preamble to obtain a second network access request frame.

In embodiments of the disclosure, the step 602 may further include: determining, by the relay device, whether the terminal is preset in a second information set (e.g., a white list); and if the terminal is in the second information set, sending, by the relay device, a second network access request frame to the base station according to the first network access request frame.

A second information set is preset in the relay device. Identity information (including an application ID (AppEUI), a terminal ID (DevEUI), a terminal address DevAddr, an Organizationally Unique Identifier (OUI) in the DevEUI, a LoRa network identifier (Net ID) in the DevAddr, and the like) corresponding to the terminal is recorded in the second information set. The second information set may be provided via a network or in an out-of-band manner. The out-of-band manner may be a factory setting manner of the relay device. The second information set may be preset in the relay device before leaving the factory.

In an example, the first network access request frame sent by the terminal to the relay device may include a first mode identifier and a terminal identifier, and the relay device may record, according to the terminal identifier, an identifier indicating that the terminal is operating in the second mode.

In another example, the first network access request frame sent by the terminal to the relay device may not include the first mode identifier.

In yet another example, the first network access request frame sent by the terminal to the relay device may include a second mode identifier. For instance, the second mode identifier (Class C mode identifier) refers to the value of a DeviceModeInd command. The first network access request frame may carry such a mac command as DeviceModeInd. The command can indicate whether the terminal is operating in a Class C mode or in a Class A mode. When the value of the command is 0×00, it indicates the Class A mode. When the value of the command is 0×02, it indicates the Class C mode.

In step 603, the relay device receives a network access response frame sent by the base station and sends the network access response frame to the terminal. After receiving the network access request frame sent by the relay device, the base station sends a network access response frame to the relay device. The network access response frame includes a second preamble, and the relay device receives the network access response frame according to the second preamble. Afterwards, the relay device sends the network access response frame to the terminal, and the terminal is connected to the network successfully after receiving the network access response frame.

In embodiments of the disclosure, the step of receiving the network access response frame sent by the base station may further include: receiving, by the relay device, the network access response frame sent by the base station in a first receiving window after the terminal sends the first network access request frame.

In embodiments of the disclosure, the step of sending the network access response frame to the terminal may further include: sending, by the relay device, the network access response frame to the terminal in a second receiving window after the terminal sends the first network access request frame; and the relay device entering a dormancy state after sending the network access response frame.

According to the LoRaWAN protocol, the terminal can open two receiving windows after each uplink transmission. For example, the receiving windows can include a first receiving window (RX1) and a second receiving window (RX2). The starting time of the first receiving window and the second receiving window can be specified with reference to the end time of the uplink transmission.

For the first mode (e.g., Class B mode), the terminal can also open a receiving window at a specified time in addition to opening a random receiving window in the Class A mode. In the Class A mode, each uplink is followed by two transitory downlink receiving windows to achieve two-way transmission accordingly.

For the second mode (e.g., Class C mode), the terminal basically opens the receiving window all the time and only closes it temporarily at the time of sending. Specifically, in the second mode, a transitory RX1 is opened, and then RX2 is opened. RX2 will be kept all the time till data needs to be sent.

When the terminal receives the network access response frame, the network access is successful. Then, the terminal may send an uplink data frame to the base station through the relay device, and receive, through the relay device, a downlink data frame sent by the base station.

It should be noted that for ease of description, the method embodiments are all described as a series of action combinations. However, those skilled in the art should understand that the embodiments of this application are not limited to the described sequence of the actions, because some steps may be performed in another sequence or at the same time according to the embodiments of this application. In addition, those skilled in the art should also understand that the embodiments described in this specification all belong to preferred embodiments, and the involved actions are not necessarily mandatory to the embodiments of this application.

Figure 7:
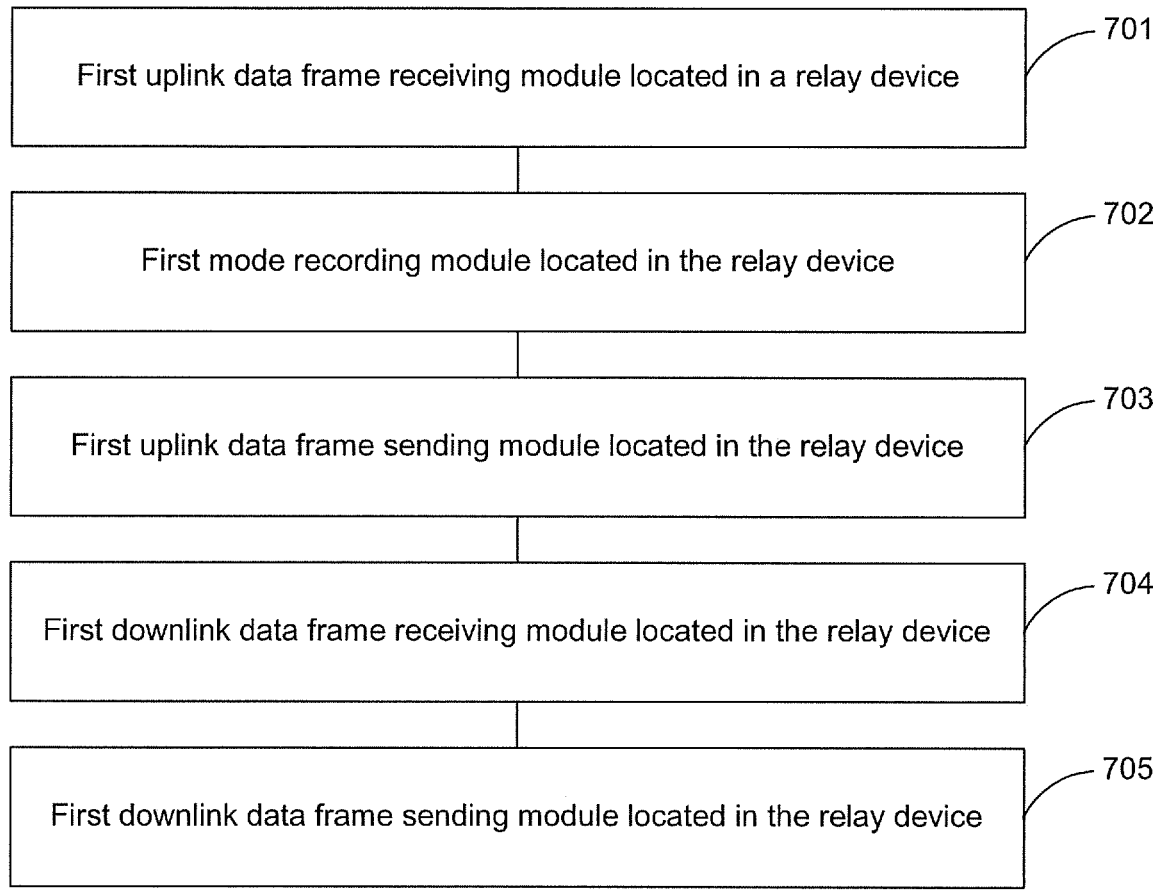
FIG. 7 is a structural block diagram of an exemplary communication apparatus, according to embodiments of the disclosure.

FIG. 7 is a structural block diagram of an exemplary communication apparatus 700, according to embodiments of the disclosure. Apparatus 700 may include the following modules.

A first uplink data frame receiving module 701 can be located in a relay device and configured to receive a first uplink data frame sent by a terminal. The first uplink data frame includes a first mode identifier and a terminal identifier, the terminal operates in a second mode, and the first mode identifier is used to make a base station believe that the terminal operates in a first mode.

A first mode recording module 702 can be located in the relay device and configured to record a mode in which the terminal operates as the second mode according to a first information set and the terminal identifier.

A first uplink data frame sending module 703 can be located in the relay device and configured to send the first uplink data frame to the base station.

A first downlink data frame receiving module 704 can be located in the relay device and configured to receive a first downlink data frame sent by the base station.

A first downlink data frame sending module 705 can be located in the relay device and configured to send the first downlink data frame to the terminal.

In embodiments of the disclosure, apparatus 700 may further include: a first information set acquiring module located in the relay device and configured to acquire the first information set in an out-of-band manner.

In embodiments of the disclosure, the first uplink data frame further includes first period information; and the first downlink data frame receiving module 704 may include: a first downlink data frame receiving submodule configured to receive, in the first mode according to the first period information, the first downlink data frame sent by the base station.

In embodiments of the disclosure, the first period information is provided in a first field of the first uplink data frame.

In embodiments of the disclosure, the first downlink data frame sending module 705 may further include: a first downlink data frame sending submodule configured to send, in the second mode, the first downlink data frame to the terminal.

Figure 8:
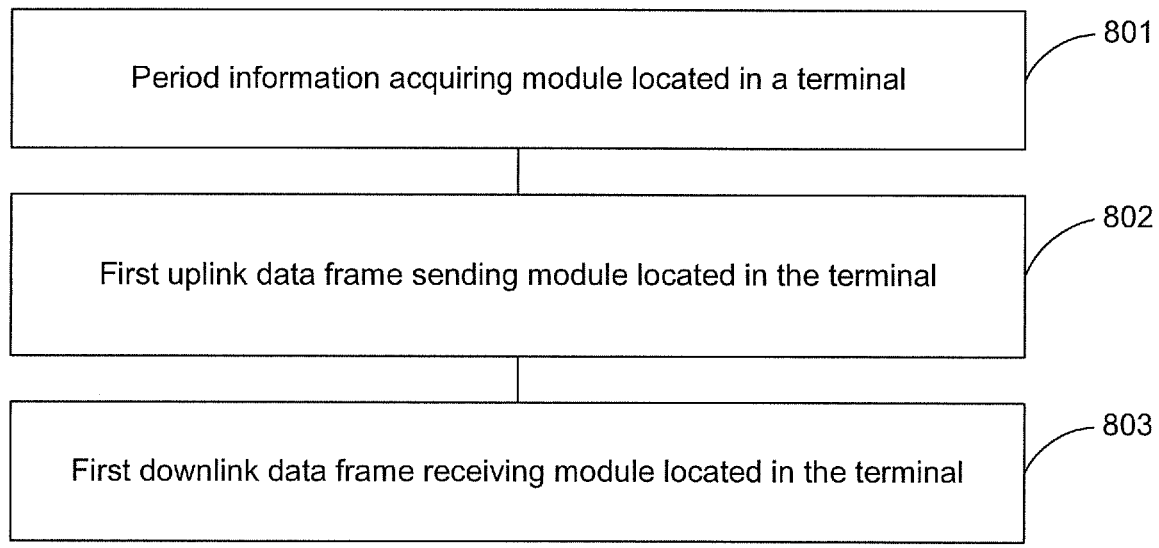
FIG. 8 is a structural block diagram an exemplary apparatus for communications between a terminal and a base station, according to embodiments of the disclosure.

FIG. 8 is a structural block diagram an exemplary apparatus 800 for communications between a terminal and a base station, according to embodiments of the disclosure. Apparatus 800 may include the following modules.

A period information acquiring module 801 can be located in the terminal and configured to determine a first period information set from at least one preset period information set and to acquire first period information according to the first period information set, wherein the terminal is operating in a second mode.

A first uplink data frame sending module 802 can be located in the terminal and configured to send, in a relay device mode, a first uplink data frame to a relay device. The first uplink data frame includes the first period information, a first mode identifier, and a terminal identifier. The first period information is used to allow the relay device to receive, according to the first period information, a first downlink data frame sent by the base station, and the terminal identifier is used to allow the relay device to record a mode in which the terminal operates as the second mode according to a first information set and the terminal identifier.

A first downlink data frame receiving module 803 can be located in the terminal and configured to receive the first downlink data frame sent by the relay device.

In embodiments of the disclosure, apparatus 800 may further include: a mode switching module located in the terminal and configured to switch from a normal node to the relay device mode.

In embodiments of the disclosure, first downlink data frame receiving module 803 may further include: a first downlink data frame receiving submodule configured to receive, in the second mode, the first downlink data frame sent by the relay device.

Figure 9:
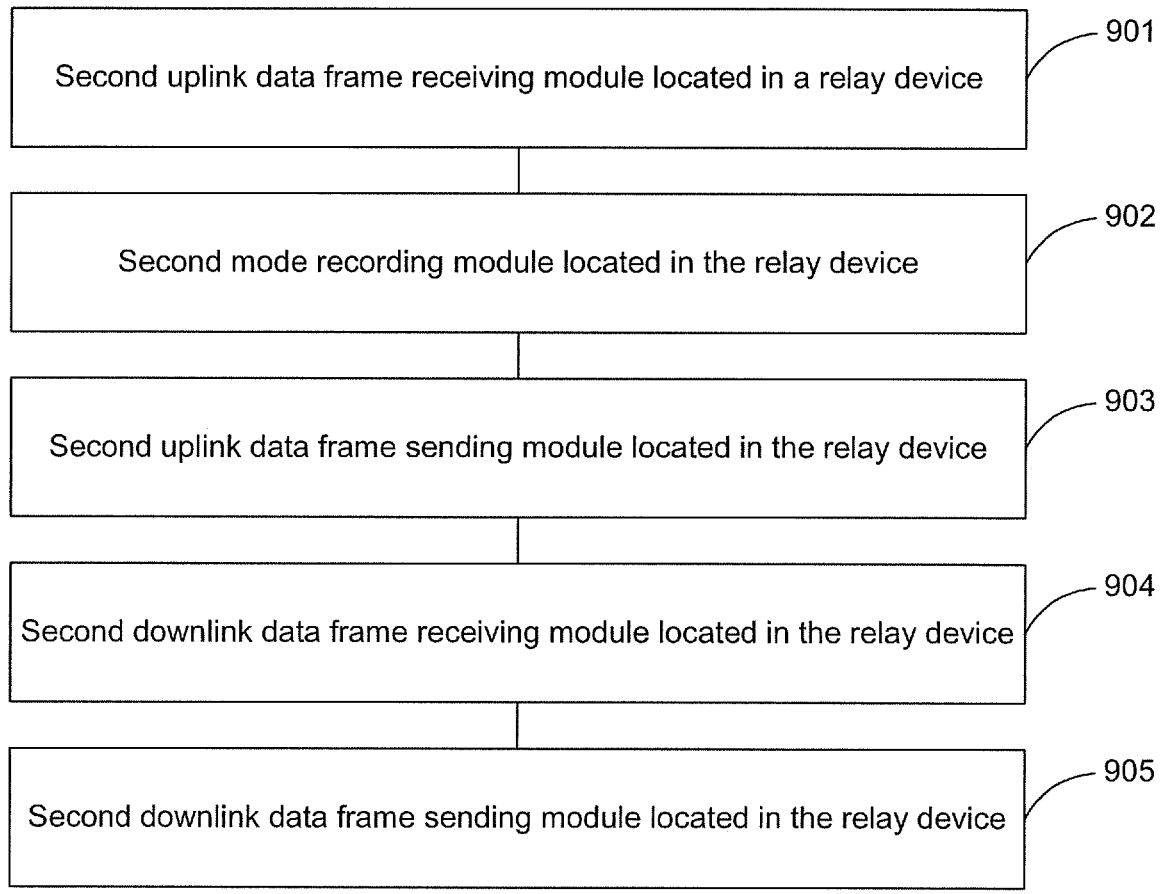
FIG. 9 is a structural block diagram of an exemplary communication apparatus, according to embodiments of the disclosure.

FIG. 9 is a structural block diagram of an exemplary communication apparatus 900, according to embodiments of the disclosure. Apparatus 900 may include the following modules.

A second uplink data frame receiving module 901 can be located in a relay device and configured to receive a first uplink data frame sent by a terminal. The first uplink data frame includes a terminal identifier, and the terminal is operating in a second mode.

A second mode recording module 902 can be located in the relay device and configured to record a mode in which the terminal operates as the second mode according to a first information set and the terminal identifier.

A second uplink data frame sending module 903 can be located in the relay device and configured to send a second uplink data frame to a base station. The second uplink data frame includes a first mode identifier used to make the base station believe that the terminal is operating in a first mode.

A second downlink data frame receiving module 904 can be located in the relay device and configured to receive a first downlink data frame sent by the base station.

A second downlink data frame sending module 905 can be located in the relay device and configured to send the first downlink data frame to the terminal.

In embodiments of the disclosure, the first uplink data frame may include the first mode identifier.

In embodiments of the disclosure, the second uplink data frame may further include a check code, and apparatus 900 may further include: a first key acquiring module located in the relay device and configured to acquire a network key of the terminal in an out-of-band manner; and a first check code generating module located in the relay device and configured to generate the check code according to the network key.

In embodiments of the disclosure, apparatus 900 may further include: a second information set acquiring module located in the relay device and configured to acquire the first information set in the out-of-band manner.

In embodiments of the disclosure, the second uplink data frame further includes first period information that is provided in a first field of the second uplink data frame; and second downlink data frame receiving module 904 may include: a second downlink data frame receiving submodule configured to receive, in the first mode according to the first period information, the first downlink data frame sent by the base station.

In embodiments of the disclosure, second downlink data frame sending module 905 may include: a second downlink data frame sending submodule configured to send, in the second mode, the first downlink data frame to the terminal.

In embodiments of the disclosure, apparatus 900 may further include: a period information set determining module located in the relay device and configured to determine a first period information set from at least one preset period information set; and a period information determining module located in the relay device and configured to acquire the first period information according to the first period information set.

Figure 10:
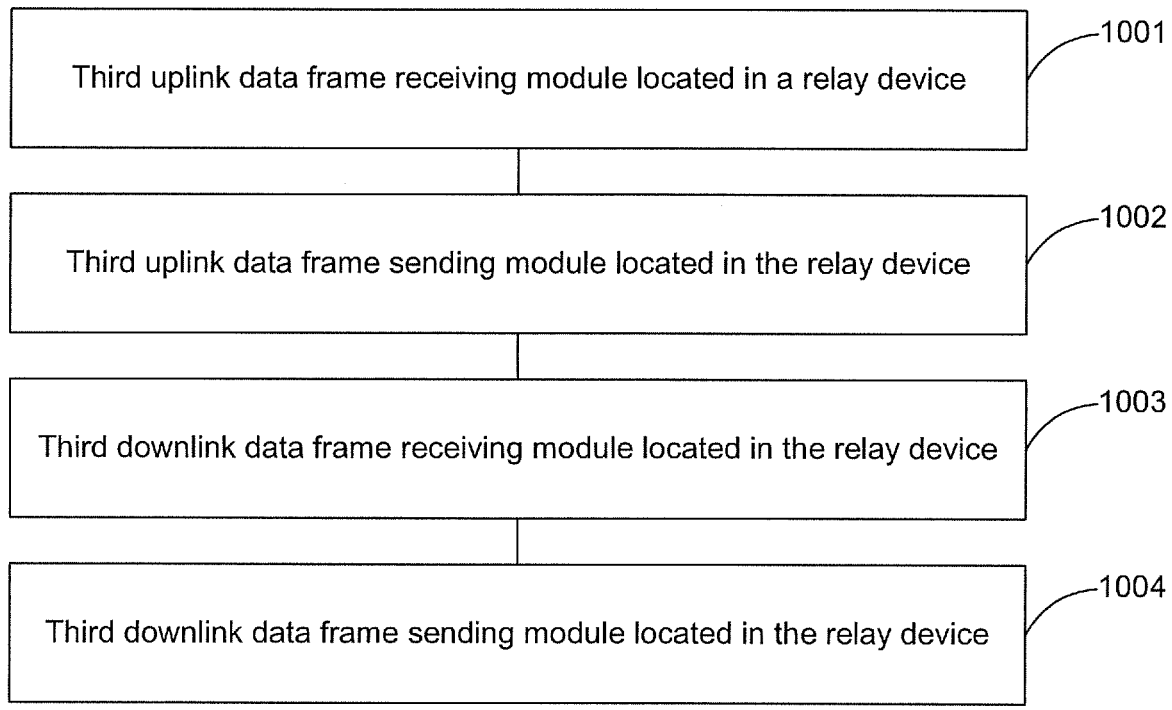
FIG. 10 is a structural block diagram of an exemplary communication apparatus, according to embodiments of the disclosure.

FIG. 10 is a structural block diagram of an exemplary communication apparatus 1000, according to embodiments of the disclosure. Apparatus 1000 can include the following modules.

A third uplink data frame receiving module 1001 can be located in a relay device and configured to receive a first uplink data frame sent by a terminal. The first uplink data frame includes a second mode identifier, and the terminal is operating in a second mode.

A third uplink data frame sending module 1002 can be located in the relay device and configured to send a second uplink data frame to a base station. The second uplink data frame includes a first mode identifier used to make the base station believe that the terminal is operating in a first mode.

A third downlink data frame receiving module 1003 can be located in the relay device and configured to receive a first downlink data frame sent by the base station.

A third downlink data frame sending module 1004 can be located in the relay device and configured to send the first downlink data frame to the terminal.

In embodiments of the disclosure, the second uplink data frame includes a check code, and apparatus 1000 may further include: a second key acquiring module located in the relay device and configured to acquire a network key of the terminal in an out-of-band manner; and a second check code generating module located in the relay device and configured to generate the check code according to the network key.

In embodiments of the disclosure, the second uplink data frame may further include first period information that is provided in a first field of the second uplink data frame. Third downlink data frame receiving module 1003 may include: a third downlink data frame receiving submodule configured to receive, in the first mode according to the first period information, the first downlink data frame sent by the base station.

In embodiments of the disclosure, third downlink data frame sending module 1004 may include: a third downlink data frame sending submodule configured to send, in the second mode, the first downlink data frame to the terminal.

Apparatuses described herein are similar to the methods described above, and therefore are described briefly for simplicity.

In some embodiments, a computer program product may include a non-transitory computer-readable storage medium having computer-readable program instructions thereon for causing one or more processors to carry out the above-described methods.

The computer-readable storage medium may be a tangible device that can store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object-oriented programming language, and conventional procedural programming languages. The computer readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The computer-readable program instructions may be provided to one or more processors of a computer, or other programmable data processing apparatus to produce a machine, such that the instructions, which execute via the one or more processors of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

Although the specification has been described in conjunction with specific embodiments, many alternatives, modifications and variations will be apparent to those skilled in the art. Accordingly, the following claims embrace all such alternatives, modifications and variations that fall within the terms of the claims.

What is claimed is:

1. A communication method of a relay device, comprising:
   receiving a first uplink data frame from a terminal operating in a second mode, wherein the first uplink data frame comprises a first mode identifier and a terminal identifier, and the first mode identifier is used to indicate to a base station that the terminal is operating in a first mode that is different from the second mode, and wherein the first uplink data frame further comprises first period information;
   determining that the terminal operates in the second mode, according to a first information set and the terminal identifier, the first information set being acquired in an out-of- band manner;
   sending the first uplink data frame to the base station;
   receiving, by the relay device operating in the first mode, a first downlink data frame from the base station according to the first period information; and
   forwarding the first downlink data frame to the terminal.

2. The method of claim 1, wherein the first period information is provided in the first uplink data frame.

3. The method of claim 2, wherein forwarding the first downlink data frame to the terminal comprises:
   forwarding the first downlink data frame to the terminal, when the relay device operates in the second mode.

4. A relay device in a communication system, comprising:
   a memory storing a set of instructions; and
   at least one processor configured to execute the set of instructions to cause the relay device to perform:
      receiving a first uplink data frame from a terminal operating in a second mode, wherein the first uplink data frame comprises a first mode identifier and a terminal identifier, and the first mode identifier is used to indicate to a base station that the terminal is operating in a first mode that is different from the second mode, and wherein the first uplink data frame further comprises first period information;

determining that the terminal operates in the second mode, according to a first information set and the terminal identifier, the first information set being acquired in an out-of-band manner;

sending the first uplink data frame to the base station;

receiving, by the relay device operating in the first mode, a first downlink data frame from the base station according to the first period information; and forwarding the first downlink data frame to the terminal.

5. The relay device of claim 4, wherein the first period information is provided in the first uplink data frame.

6. The relay device of claim 5, wherein forwarding the first downlink data frame to the terminal further comprises:

forwarding the first downlink data frame to the terminal, when the relay device operates in the second mode.

7. A non-transitory computer readable medium that stores a set of instructions that is executable by at least one processor of a computer device to cause the computer device to perform a communication method, the method comprising:

receiving a first uplink data frame from a terminal operating in a second mode, wherein the first uplink data frame comprises a first mode identifier and a terminal identifier, and the first mode identifier indicates to a base station that the terminal is operating in a first mode that is different from the second mode, and wherein the first uplink data frame further comprises first period information;

determining that the terminal operates in the second mode, according to a first information set and the terminal identifier, the first information set being acquired in an out-of-band manner;

sending the first uplink data frame to the base station;

receiving, by the relay device operating in the first mode, a first downlink data frame from the base station according to the first period information; and forwarding the first downlink data frame to the terminal.

8. The non-transitory computer readable medium of claim 7, wherein the first period information is provided in the first uplink data frame.

9. The non-transitory computer readable medium of claim 8, wherein forwarding the first downlink data frame to the terminal comprises:

forwarding the first downlink data frame to the terminal, when the relay device operates in the second mode.

* * * * *